United States Patent Office 2,709,504
Patented May 31, 1955

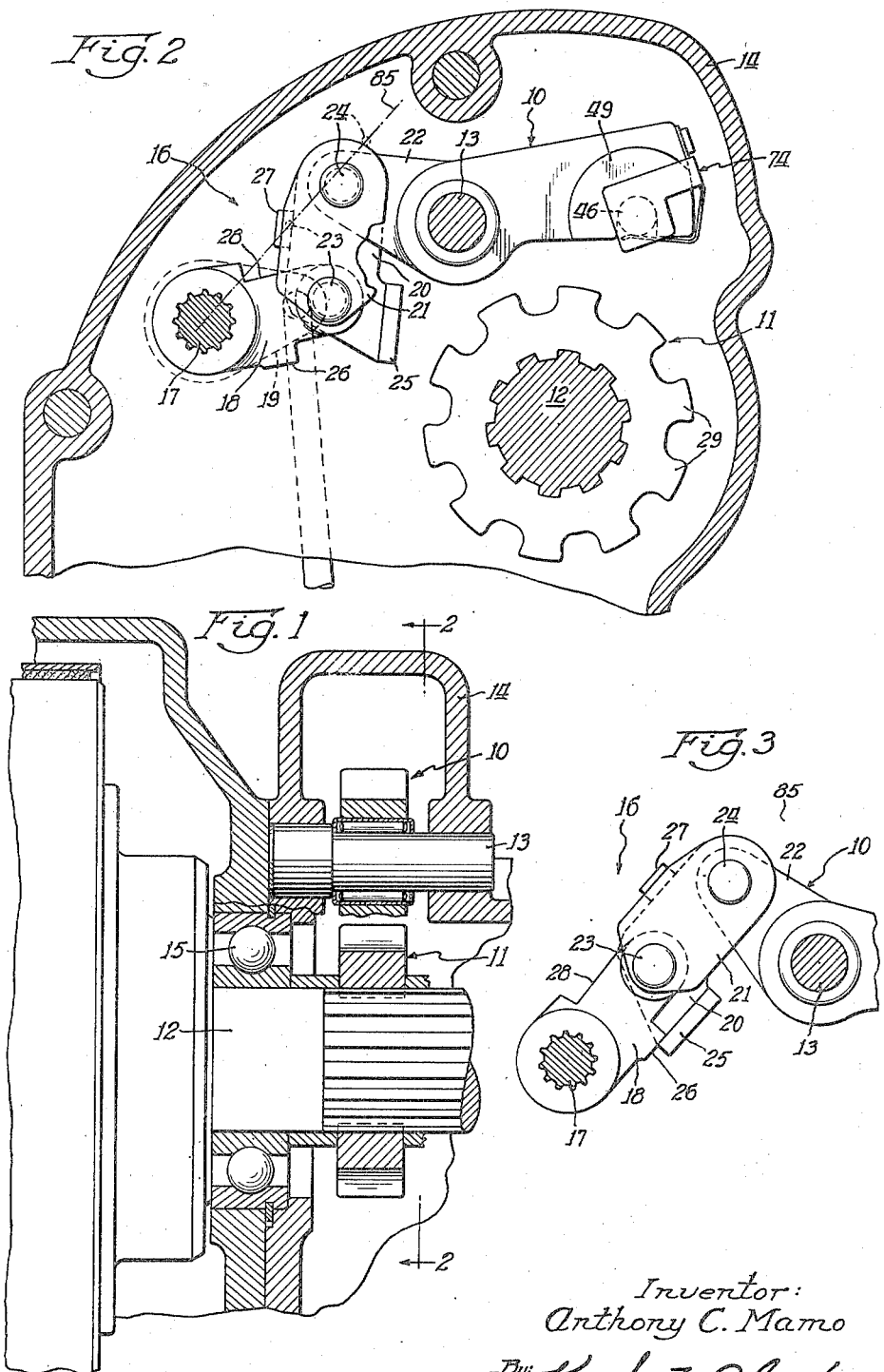

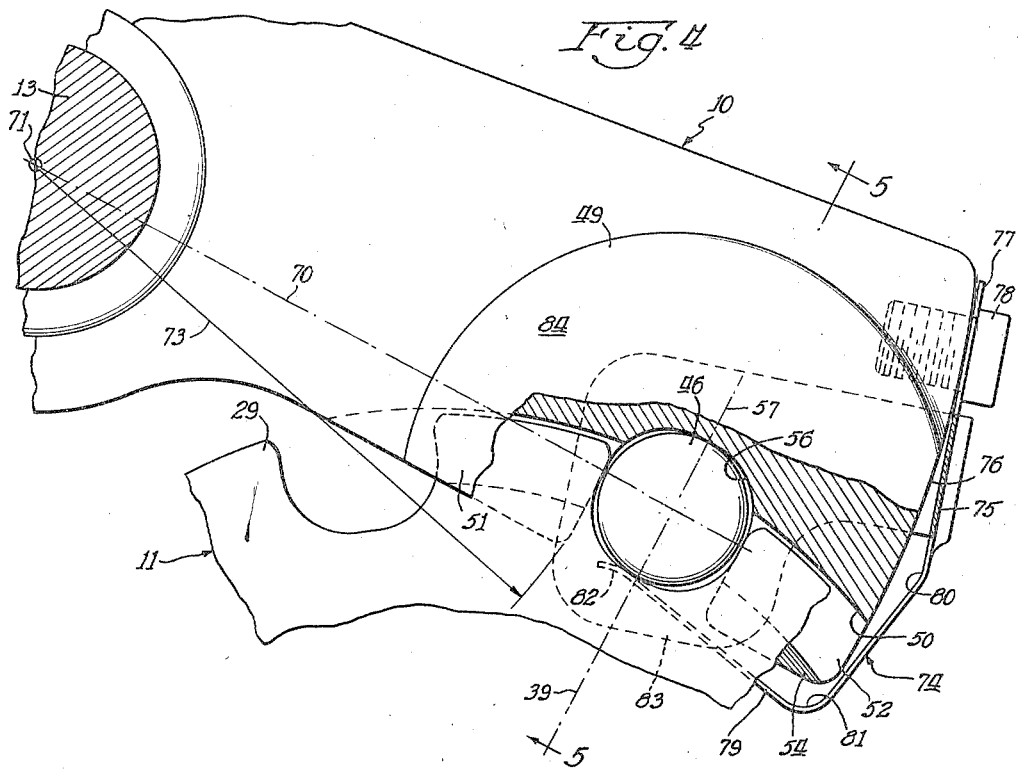
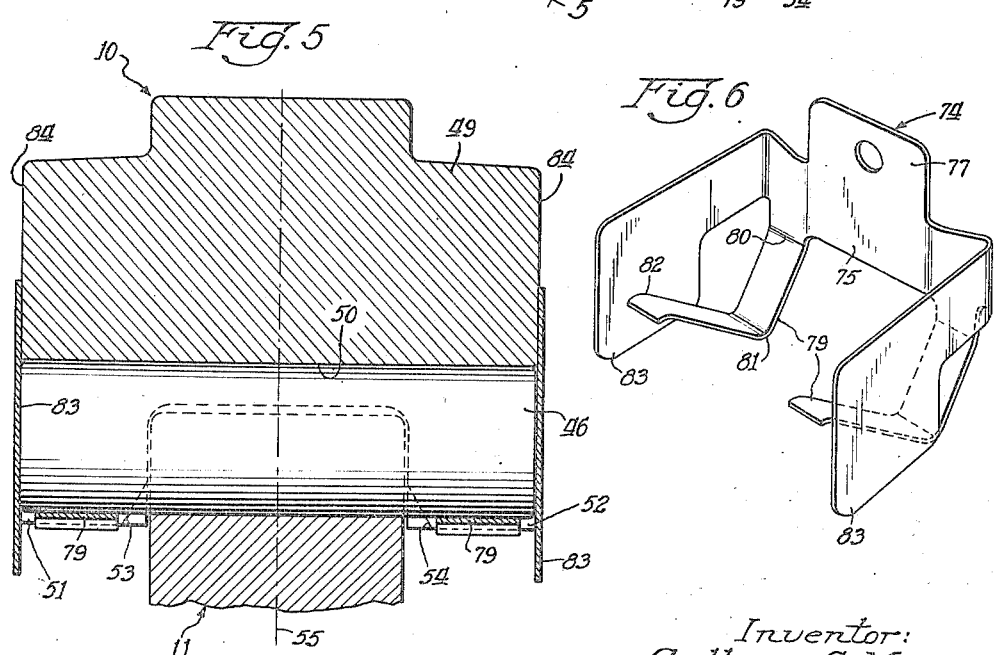
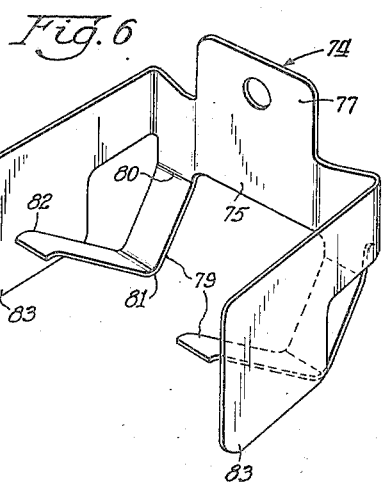

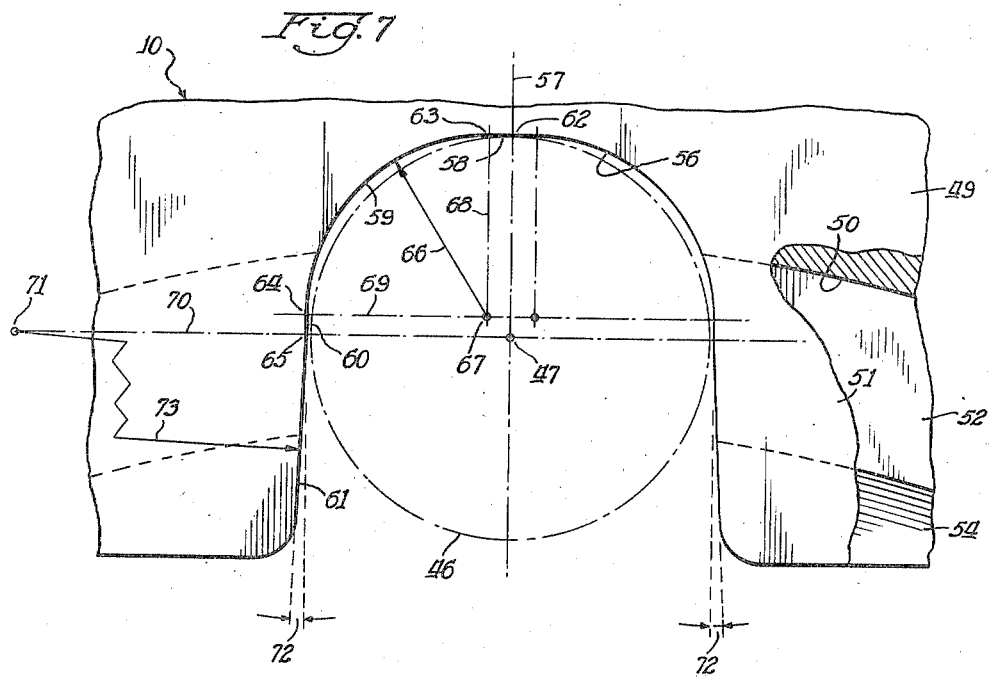
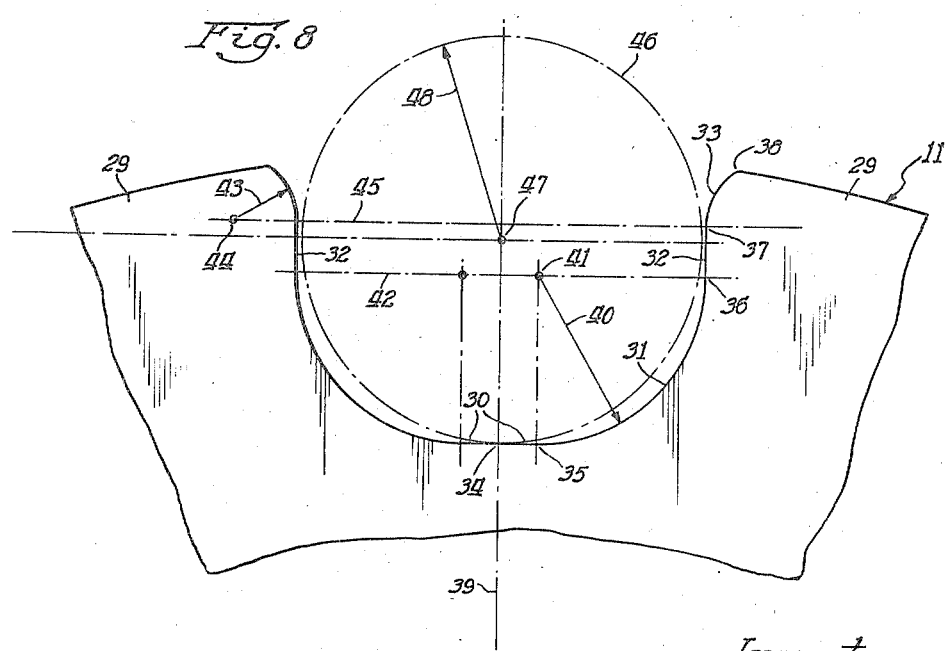

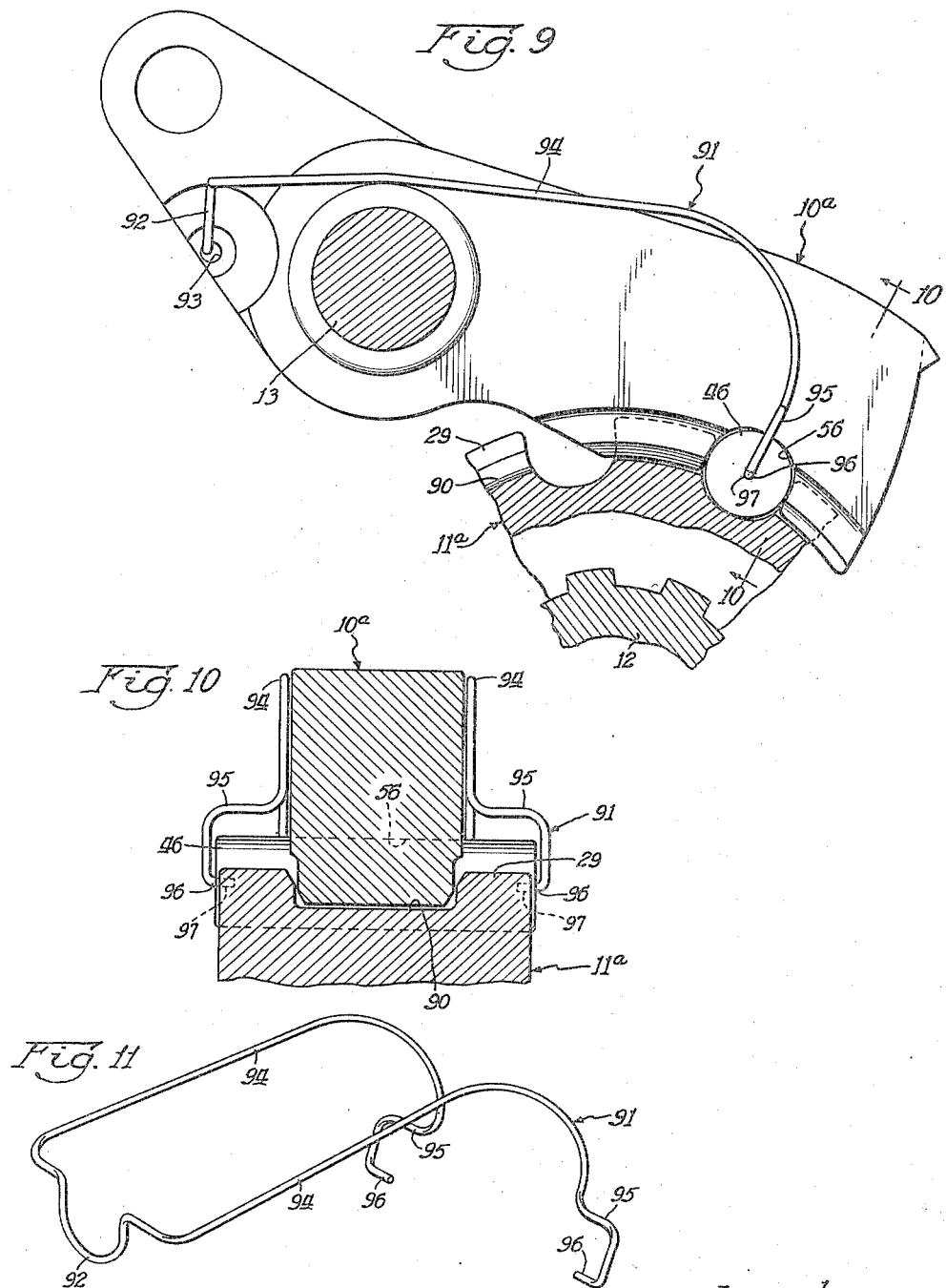

2,709,504

ANTI-FRICTION PARKING BRAKE

Anthony C. Mamo, Detroit, Mich., assignor to Borg-Warner Corporation, Chicago, Ill., a corporation of Illinois Application July 21, 1952, Serial No. 299,980

9 Claims. (Cl. 188—69)

My invention relates to positive type brakes and, more particularly, to brakes of this type which are particularly adapted to be used as parking brakes for automotive vehicles.

Positive type parking brakes are well-known and are in common use in automotive vehicles. These brakes, in general, comprise a gear which is engageable by a swinging pawl so as to hold the gear from rotation. When such a brake is used in an automotive vehicle, being connected with road wheels of the vehicle so that the gear is rotatable along with the road wheels, there is a torque exerted on the gear, assuming that a torque is also exerted on the vehicle road wheels. This would be the case when the vehicle is parked on a hill, for example, such that the vehicle tends to run down the hill and is prevented by the parking brake. Under such circumstances, the torque exerted on the parking brake tends to hold the pawl, due to the binding action of the gear on the pawl, from being moved out of engagement with the gear, so that, in many cases with such brakes, it is practically impossible to disengage the pawl from the gear and disengage the parking brake. Ordinary brakes of this type also have the disadvantage that they may be engaged at substantial speeds of the gear and of the vehicle, and damage to the gear or pawl quite often occurs at such engagement at these speeds.

It is an object of the present invention to provide an improved positive type brake, particularly adapted for use as a parking brake in an automotive vehicle, which may be easily disengaged even though there is substantial torque impressed on the brake, due to the vehicle being parked on a hill, for example, and which will ratchet and resist engagement at all speeds of the gear and vehicle except very low speeds.

More particularly, it is an object of the invention to provide an anti-friction engaging mechanism between the pawl and the gear, so that the pawl can be easily withdrawn from the gear and will ratchet on the gear except at very low speeds. More specifically, it is an object of the invention to provide a roller carried in a recess in the pawl adapted to engage with the gear of the brake to provide this anti-friction action.

It is another object of the invention to so shape the teeth of the gear and the recess in the pawl in which the roller is located that torque on the gear does not tend to either hold the roller engaged with the gear or to expel the roller and thereby the pawl out of engagement with the gear, the surfaces in contact with the roller being at right angles with respect to the direction of the force between the pawl and the gear.

It is also an object of the invention to provide a toggle linkage between a rotatable control shaft and the pawl which goes to a dead center condition when the pawl is fully engaged by means of its roller with the gear, rather than going over-center, so that torque on the gear due to the vehicle being parked on a hill, for example, does not act through the linkage to prevent a turning of the control shaft for disengaging the pawl and roller from the gear.

It is a still further object of the invention to provide an improved resilient roller retainer for holding the roller within the recess in the pawl but yet allowing a limited rolling movement of the roller on side faces of the recess as would occur during disengagement of the pawl and gear.

The invention consists of the novel constructions, arrangements and devices to be hereinafter described and claimed for carrying out the above stated objects and such other objects, as will appear from a detailed description of certain preferred embodiments of the invention illustrated with reference to the accompanying drawings, wherein:

Fig. 1 is a partial, longitudinal, sectional view of a transmission for an automotive vehicle including a parking brake embodying the principles of the invention;

Fig. 2 is a sectional view taken on line 2—2 of Fig. 1 in the direction indicated, with the parking brake being shown in elevation and in disengaged condition;

Fig. 3 is a view of certain parts of the parking brake shown in the same manner as in Fig. 2, but with the parts in different positions corresponding to an engaged condition of the parking brake;

Fig. 4 is a partial elevational view on an enlarged scale, with the parking brake being shown in an engaged condition;

Fig. 5 is a sectional view taken on line 5—5 of Fig. 4 in the direction indicated;

Fig. 6 is a perspective view of a resilient retainer for a roller which is a part of the parking brake;

Fig. 7 is a partial elevational view on an enlarged scale showing the roller as it fits into a recess formed in a pawl, which is a part of the parking brake;

Fig. 8 is a view on the same scale as Fig. 7 showing the roller disposed in a recess between adjacent teeth of a gear, which is a part of the parking brake;

Fig. 9 is a partial side elevational view of a parking brake constituting a modification of the invention;

Fig. 10 is a sectional view taken on line 10—10 of Fig. 9 in the direction indicated; and Fig. 11 is a perspective view of a retainer spring for yieldably holding the roller within the recess in the pawl, constituting parts of the modified form of the invention shown in Figs. 9 and 10.

Like characters of reference designate like parts in the several views.

Referring now to the drawing, the positive type brake illustrated in Figs. 1 to 8 comprises a pawl 10 engageable with a toothed gear 11. The gear 11 is splined onto a shaft 12 which is the shaft to be braked, and the pawl 10 is swingably mounted on a shaft 13. The shaft 12 is rotatably disposed in a casing 14 by means of a ball bearing 15, and the shaft 13 is fixed with respect to the casing 14. The casing 14 may be the casing of a transmission in an automotive vehicle, and the shaft 12 may be the output shaft of the transmission connected to the driving road wheels of the vehicle.

The pawl 10 is swung toward and away from the gear 11 by means of a pawl actuating linkage 16. The linkage 16 comprises a shaft 17 journaled in the transmission casing 14 and having a lever 18 fixed on one end and a lever 19 fixed on the other end. The lever 19 may be actuated to rotate the shaft 17 manually or by any suitable means (not shown). The lever 18 is connected by links 20 and 21 with an end 22 of the pawl 10. The links 20 and 21 are pivotally connected with the lever 18 by means of a pin 23 extending through the lever 18 and the links 20 and 21, and the links are pivotally connected with the pawl 10 by means of a similar pin 24. The link 20 is disposed on one side of the lever 18 and pawl end 22, and the link 21 is disposed on the other side of the lever 18 and pawl end 22, as will be understood.

The link 20 is provided with a laterally extending lug 25 adapted to abut against an edge portion 26 of the lever 18 for limiting swinging movement of the links 20 and 21 with respect to the lever 18 in one direction, and the link 20 is provided with a second laterally extending lug 27 adapted to abut against another edge portion 28 of the lever 18 for limiting the swinging movement of the links 20 and 21 in the opposite direction, for the purposes hereinafter to be described.

The gear 11 is formed with a number of spaced teeth 29. The side faces of each of the teeth are made up of four portions 30, 31, 32, and 33 (see Fig. 8). The portion 30 extends between the points 34 and 35; the portion 31 extends between the points 35 and 36; the portion 32 extends between the points 36 and 37; and the portion 33 extends between the points 37 and 38; the points 34, 35, 36, 37, and 38 being on the side face of each tooth. The point 34 lies on a center line 39 bisecting the space between two adjacent teeth 29 and passing through the centers of the gear 11 and shaft 12, and the portions 30 of adjacent teeth are connected and form substantially a flat surface extending perpendicular to the center line 39. The portion 31 of each tooth face lies on a radius 40 taken about a center point 41 which lies on a center line 42 extending through the point 36 and at a right angle with respect to the center line 39. The portion 32 of each tooth face lying between the points 36 and 37 lies parallel to the center line 39. The portion 33 lies on a radius 43 drawn from a point 44 lying on a center line 45 which is at right angles to the center line 39. It will be observed that the center points 41 for the radii 40 for the opposite facing side faces 31 of two teeth 29 are spaced from each other on the center line 42, so that the space between adjacent teeth 29 is elongated.

A cylindrical roller 46 carried by the pawl 10 is adapted to fit between two adjacent teeth 29. The roller 46 when positioned as shown in Figs. 4 and 8 between two of the teeth 29 rests on the surfaces 30 of the two teeth and has its center at 47, the roller 46 being formed on a radius 48. The center 47, with the roller positioned as shown in Fig. 8, lies between the center lines 42 and 45, with the radius 48 being greater than the distance between the point 34 and the center line 42 and less than the distance between the point 34 and the center line 45. Thus, when the roller 46 is moved toward one of the teeth 29 or the other, it will abut one of the surfaces 32 which lies parallel to the center line 39.

The pawl 10 is provided with an enlarged end portion 49 on its free end of greater width than the remainder of the pawl. The pawl in the portion 49 is provided with a cylindrical cavity 50 of approximately the same radius as the gear 11, and the cavity 50 is bounded on its sides by flange portions 51 and 52. The internal edges of the flange portions 51 and 52 are beveled at 53 and 54, respectively, at approximately 30 degrees with respect to a vertical axis 55 of the pawl. The axis of the shafts 13 and 12 are parallel to each other, and the pawl 10 is aligned with the gear 11, so that, when the pawl is swung in the clockwise direction as seen in Fig. 2, the cavity 50 will receive the periphery of the gear 11 with the flange portions 51 and 52 embracing sides of the gear (see Fig. 4). The pawl 10 swings in a plane parallel with the body of the gear 11 and the center line 55 of the pawl for this purpose.

The pawl 10 is provided with a cavity 56 which is parallel with the shafts 12 and 13, and is substantially symmetrical about a center line 57. The cavity 56 is formed by face portions 58, 59, 60, and 61 on both sides of the center line. The portion 58 on each side of the center line 57 extends between points 62 and 63; the face portion 59 extends between points 63 and 64; the face portion 60 extends between points 64 and 65; and the face portion 61 extends from the point 65 to the lower edge of a flange portion 51 or 52. The face portions 58 are substantially flat and extend substantially perpendicularly to the center line 57. The face portion 59 is formed on a radius 66 from a center 67 at the intersection of center lines 68 and 69. The center line 68 is parallel with the center line 57, and the center line 69 lies parallel with a center line 70 connecting centers 71 and 47. The center 71 is the center of the shaft 13 about which the pawl 10 swings, and the center 47 is the center of the roller 46 which fits in the cavity 56. The center lines 68 and 69 are at right angles to each other and respectively extend through the points 63 and 64. The faces 60 lying between the points 64 and 65 extend parallel with the center line 57. Each of the faces 61 extend from one of the points 65 and taper outwardly, being at small angle 72 with respect to the center line 57. The face 61 more adjacent the center 71 approximates a surface generated by a radius 73 from the center 71. The other face 61 more adjacent the extreme end of the pawl 10 lies at substantially the same angle with respect to the center line 57, so that the two angles 72 are approximately the same.

A resilient retainer 74 is provided for the roller 46 for keeping the roller in the cavity 56. The roller retainer 74 comprises a front portion 75 fitting over the end face 76 of the pawl 10. The portion 75 has an upwardly extending projection 77, and a machine screw 78 extends through the portion 77 and into the pawl 10 for fixing the roller retainer 74 to the pawl. The resilient retainer comprises two fingers 79, which are bent at points 80, 81, and 82. The fingers 79 extend below the flange portions 51 and 52 and underlie the roller 46 so as to hold the roller within the cavity 56. The retainer 74 is provided with rearwardly extending side plates 83 which cover the ends of the cavity 56 and are in contact with side faces 84 of the pawl 10.

The pawl 10 is engaged with the brake gear 11 by rotating the shaft 17 in a counterclockwise direction as seen in Fig. 2 by means of the lever 19. The lever 18 is swung in the same direction along with the shaft 17 and acts through the links 20 and 21 pinned to the pawl 10 and the lever 18 to rotate the pawl 10 about the shaft 13 in the clockwise direction. The end of the pawl 10 carrying the roller 46 is thus moved toward the gear 11, and the roller 46 will enter the space between two adjacent teeth 29 of the gear, assuming that the gear 11 has a correct rotative position so that the space between two adjacent teeth 29 is in alignment with the roller 46 as it moves along with the outer end of the pawl 10 toward the gear 11. If this correct alignment is not present, the gear 11 may be rotated slightly along with the shaft 12 until the correct alignment is approached and the roller 46 may roll down one of the tooth faces 33 into the space between two adjacent teeth 29. The roller 46, when completely engaged between two adjacent teeth 29 of the gear 11, as seen in Fig. 4, holds the gear 11 and thereby the shaft 12 on which the gear is fixed against rotation, and the pawl 10 and roller 46 function as a positive brake for the shaft 12. If the gear 11 is rotating at a substantial speed, which would correspond with a substantial speed of movement of the vehicle, the roller 46 will strike and roll successively on the ends of the teeth 29 holding the pawl disengaged with respect to the gear 11 as the pawl is swung toward the gear 11. The pawl 10 thus has a ratcheting action with respect to the gear 11 during which the brake is disengaged, and this ratcheting action continues as long as the gear 11 is rotating at a substantial speed, considerably less than the speed at which ratcheting would discontinue and engagement would take place if the roller 46 were not provided in lieu of a tooth formed integrally with the pawl 10 in accordance with prior teachings.

The roller retainer 74 on the free end of the pawl 10 functions to hold the roller within the cavity 56 of the pawl 10 and prevent the roller from dropping out of the cavity, when the positive brake is disengaged as seen in Fig. 2. The fingers 79 of the retainer bear with pressure substantially at their points 82 on the roller 46 holding the roller 46 against the surfaces 58 of the cavity 56. As illustrated in Fig. 7, the cavity 56 between its face portions 60 has substantially the same width as the diameter of the roller 46, with the roller having a slight clearance with the face portions 60, so that the roller may easily rotate in the cavity 56 and move partially out of the cavity against the action of the fingers 79. The side plates 83 of the roller retainer function to prevent the roller from working sidewardly out of the cavity 56.

When the pawl 10 has been moved as seen in Fig. 4, to the limit of its movement toward the gear 11, the roller 46 is bottomed on the faces 58 of the cavity 56, similarly to its position in the free condition of the pawl 10 as illustrated in Fig. 2, when the spring fingers 79 of the roller retainer hold the roller bottomed in the cavity 56. The roller 56 is also bottomed on the face surfaces 30 of two adjacent teeth 29 of the gear 11. Under these conditions, the center line 70 passing through the center 71 of the shaft 13 and through the center 47 of the roller 46 is at right angles to the center line 39 passing through the center of the gear 11 and the center 47 of the roller 46, so that a tendency of the gear 11 to rotate along with the shaft 12 does not either tend to move the roller 46 into or out of the space between adjacent teeth 29 in which the roller 46 is disposed. Assuming a tendency of the gear 11 to rotate, the roller 46 will bear against one of the side faces 32 of a tooth 29, which is parallel with the center line 39, and has no camming effect on the roller 46. The roller 46 also bears on one of the side faces 60 in the cavity 56 of the pawl 10, which extends parallel with the center line 57, and thereby with the center line 39 and which, therefore, exerts no camming effect on the roller 46 tending either to hold it in or move it out of the cavity 56. It will be noted that the roller 46 when in contact with one of the faces 32 is out of contact with any of the face portions 31 since the face portions 31 are formed with a smaller radius (from a center 41) than the radius 48 of the roller 46, and thus when the roller 46 tends to move to one side or the other of the space between two teeth 29, it has a two line bearing contact with the gear 11, namely, one line of bearing contact with a surface 32, and the other line of bearing contact with a surface 30. The roller 46 also has a two line bearing contact relationship in the cavity 56, namely, in contact with one of the faces 60 parallel with the center line 57 and another line of bearing contact with a surface 58 perpendicular to the center line 57, similarly as in the space between two teeth 29. The face surfaces 59 in the cavity 56 are out of contact with the roller 46, since the radius 66 is less than the radius 48 of the roller 46.

The linkage 16, when the pawl 10 is fully engaged with the gear 11 by means of the roller 46, has a straight line relationship, that is, the centers of the pins 24 and 23 and the shaft 17 are all on a single straight line, namely, the center line 85. The linkage 16 is thus in a dead center condition. The lug portion 25 on the link 20 under these conditions contacts the edge portion 26 on the lever 18 and prevents any over-center movement of the pin 23 with respect to the pin 24 and the shaft 17.

The pawl 10 may be moved in a brake disengaging direction by rotating the shaft 17 by means of the lever 19 in a clockwise direction, as seen in Fig. 2, to return the parts to their positions in which they are illustrated in this figure. The lever 18, when rotated with the shaft 17 in this direction, pulls on the end 22 of the pawl 10 and rotates the pawl in the counterclockwise direction. If there is a torque on the shaft 12 and thereby on the gear 11 at the time the lever 19 is so actuated, there ordinarily would be a binding action between the pawl 10 and gear 11 to hold the pawl 10 from moving out of engagement with the gear 11. The roller 46 that I have provided in connection with the pawl 10, however, constitutes an antifriction means between the pawl 10 and the gear 11, so that this binding action is substantially obviated, and the pawl 10 moves easily and freely out of engagement with the gear 11 even though there may be such a torque applied to the gear 11.

With torque being applied to the shaft 12 and gear 11, the roller 46, when a force is put on the pawl 10 tending to move its free end out of engagement with the gear 11, rolls outwardly along one of the tooth faces 32 onto one of the rounded tooth faces 33. At the same time, the roller 46 rolls along one of the faces 60 of the cavity 56 in the pawl 10 onto one of the faces 61. As has been previously explained, the surfaces 60, and 32, being respectively parallel with the center lines 57 and 39, have substantially no effect in urging the roller 46 to either move out of or stay in the cavity 56 or the space between adjacent teeth 29, and this rolling action of the roller 46 is thus very free. The movement of the roller 46 out of the cavity 56 is against the spring action of the fingers 79 which flex to allow the roller movement. The cavity face 61 more adjacent the center 71 of the pin 24 is substantially on the radius 73 taken from the center 71, so that, in case the gear 11 tends to rotate under torque in the counterclockwise direction as seen in Fig. 4, the roller 46 when it moves onto the surface 61 is not impeded in its movement and such additional movement of the roller 46 is likewise free. The roller 46, in case the tendency to rotate of the gear 11 is in the opposite direction, moves on the surface 61 remote from the center 71, and this surface 61 also does not impede rolling movement of the roller on the particular surface 61. The spring fingers 79 flex during rolling movement of the roller 46 out of the cavity 56 during disengagement of the brake and snap the roller back into its Fig. 2 position in the cavity 56 when the brake is fully disengaged, it being understood that the roller 46 only partially moves out of the cavity 56 during brake disengagement.

The lug portion 27 on the link 20 is adapted to contact and abut against the edge surface 28 on the lever 18 for the purpose of limiting the brake disengaging rotation of the shaft 17, and the corresponding swinging movement of the pawl 10 in the counterclockwise direction as seen in Fig. 2.

The embodiment of the invention illustrated in Figs. 9, 10, and 11 is basically similar to the embodiment just described with the basic difference being that the brake gear 11a, instead of the pawl 10a, is provided with a longitudinally extending recess for receiving the other. The teeth 29 on the gear 11a are each provided with a recess 90 forming a circumferential groove around the gear 11a in which the end of the pawl 10a may fit. The teeth 29 of the gear 11a may be shaped similarly to the teeth on the gear 11 so as to provide a recess or space between the teeth 29 of the same shape as in the gear 11, and the pawl 10a may be provided with a cavity 56 of the same cross sectional shape as in the pawl 10. A roller 46 fits within the cavity 56 of the pawl 10a and between the teeth 29 of the gear 11a in the same manner as has been described in connection with the pawl 10 and gear 11 in the first embodiment, and the shafts 13 and 12 are located in the same positions, so that the roller 46 in the second embodiment, as in the first embodiment, is not pried into or out of the cavity 56 in the pawl 10a or the space between the teeth 29 of the gear 11a when a torque is applied to the gear 11a with the roller 46 being disposed simultaneously in both the cavity 56 of the pawl 10a and between adjacent teeth 29 of the gear 11a to engage the brake.

A wire spring 91 is provided for holding the roller 46 within the cavity 56 in the pawl 10a. The spring 91 comprises a centrally bowed portion 92 extending through an opening 93 in the pawl 10a. The spring 91 has two leg portions 94 extending alongside of the pawl 10a on each side thereof and overlying and in contact with the shaft 13 on which the pawl 10a is swingingly mounted. The spring 91 is provided with outwardly bent portions 95 on each end thereof and terminates in two return bent portions 96. The return bent portions extend into holes 97 formed in opposite ends of the roller 46, so that the spring 91 yieldably holds the roller within the cavity 56 in the pawl 10a under spring action. The spring 91 functions during release of the pawl 10a from the gear 11a similarly to the roller retainer 74 in the first embodiment in allowing a limited rolling movement of the roller 46 out of the cavity 56 in the pawl 10a.

My improved brake is advantageously adapted for braking any rotatable shaft against rotation, and the brake is particularly suitable for use in automotive vehicles for acting as a parking brake for preventing movement of the vehicle when the engine is not in operation. When used in automotive vehicles, the shaft 12 may be operatively connected with the driving road wheels of the vehicle and may be the driven shaft of the transmission of the vehicle. The vehicle may be parked on a hill, for example, and in this case there is a constant torque on the shaft 12 which would cause binding of the engaging parts of the gears 11 and 11a and the pawls 10 and 10a tending to prevent disengagement of the pawls from the gears. The rollers 46 constitute an anti-friction device operatively connecting the pawls with the gears which has a rolling action with respect to the pawls and gears, so that the pawls may be easily withdrawn from the gears even though there is a constant torque on the shaft 12. The sides of the cavities in the pawls 10 and 10a and the sides of the teeth on the gears 11 and 11a are such that they do not tend to either hold the rollers 46 in engagement with the gears and pawls or tend to move the rollers out of engagement, and the linkage 16, furthermore, goes to a dead center relationship when the pawls 10 and 10a are fully engaged with the gears 11 and 11a by means of the rollers such that the linkage 16 also need not be forced in order to disengage the pawls from the gears even though there is a constant torque on the gears. The rollers 46 also have the additional advantageous function of causing a ratcheting and continued disengagement of the pawls with respect to the gears 11 when the gears 11 are rotating at a substantial speed, and the pawls by means of the rollers 46 will not engage with the gears 11 until the gears 11 are reduced in speed substantially below that speed at which a pawl with an integral tooth in an ordinary brake will engage with a mating gear and which often causes breakage of parts. The rollers 46 may have this ratcheting function above 3 to 4 miles per hour vehicle speed, which is considerably less than the speed at which an ordinary pawl and gear positive brake will engage on a decreasing vehicle speed.

I wish it to be understood that my invention is not to be limited to the specific arrangements and constructions shown and described, except only insofar as the claims may be so limited, as it will be apparent to those skilled in the art that changes may be made without departing from the principles of the invention.

I claim:

1. In brake mechanism, the combination of a rotatable part to be braked, a slotted member fixed on said rotatable part, said slotted member having a plurality of slots in its periphery each of said slots being generally U-shaped with a portion of each side parallel to a line joining the center of rotation of said slotted member and the center of said slot a pawl member swingably mounted on an axis which is nonrotatable with respect to said rotatable part and swingable toward and away from said slotted member, and a rolling element carried by one of said members and engageable with said other member when said pawl member is moved toward said slotted member for braking said rotatable part and for allowing easy withdrawal of said pawl member from said slotted member by rolling action of said rolling element for releasing said rotatable part for rotation.

2. In brake mechanism, the combination of a rotatable part to be braked, a transversely slotted member fixed on said rotatable part, a transversely slotted braking member nonrotatable with respect to said rotatable part and movable toward said first named slotted member to a position wherein a slot of the braking member is in substantial alinement with a slot of the first named slotted member, and a roller carried by one of said members in a slot therein and engageable in a slot in said other member when said braking member is moved toward said first named slotted member for braking said rotatable part and for allowing easy withdrawal of said braking member from said first named slotted member by rolling action of said roller in said slots for releasing said rotatable part for rotation.

3. In brake mechanism, the combination of a rotatable part to be braked, a slotted member fixed on said rotatable part, a pawl member swingably mounted on an axis nonrotatable with respect to said rotatable part and movable toward and away from said slotted member, said pawl member being provided with a slot therein, and a roller carried in a slot in one of said members and engageable in a slot of said other member when said pawl member is moved toward said first named slotted member for braking said rotatable part and for allowing easy withdrawal of said braking member from said first named slotted member by rolling action of said roller on the sides of said slots of said braking member and said first named slotted member, a center line joining the center of rotation of said pawl member and said roller being perpendicular to a center line joining the center of rotation of said first named slotted member and the center of said roller and said slots in which said roller is disposed each having portions extending parallel to said second named center line when the brake mechanism is engaged whereby a torque on said first named slotted member does not tend to move said roller either into or out of the slots of said members.

4. In brake mechanism, the combination of a rotatable part to be braked, a transversely slotted member fixed on said rotatable part, a braking pawl swingably mounted on an axis which is nonrotatable with respect to said rotatable part and swingable toward and away from said slotted member and having a transverse slot therein adapted to be alined with a slot in the first named slotted member, and a roller disposed in the slot of said pawl and engageable in a slot in said first named slotted member when said pawl is moved toward said first named slotted member for braking said rotatable part and for allowing easy withdrawal of said pawl from said first named slotted member, and a spring retainer for holding said roller yieldably in the slot in said pawl and for allowing said roller to have a limited movement in said last named slot when said brake mechanism is being disengaged.

5. In brake mechanism, the combination of a rotatable part to be braked, a transversely slotted gear fixed on said rotatable part, a pawl swingably mounted on an axis nonrotatable with respect to said rotatable part and swingable toward and away from said gear and having a slot formed therein, said gear being formed with a circumferential groove therein extending at right angles to the slots in the said gear for receiving said pawl when the latter is moved toward said gear and a roller carried by said pawl in its said slot and engageable in a slot in said gear when said pawl is moved toward said gear positioning said pawl slot and a gear slot in substantial alinement for braking said rotatable member and for allowing easy withdrawal of said pawl from said gear by rolling action of the roller.

6. In brake mechanism, the combination of a rotatable part to be braked, a slotted member fixed on said rotatable part, a pawl mounted on an axis nonrotatable with respect to said rotatable part and swingable about said axis toward and away from said slotted member and being formed with a transverse slot therein, a roller carried by said pawl in its slot and engageable in a slot in said first named slotted member when said pawl is moved toward said first named slotted member positioning said pawl slot and a slot of said first named slotted member in substantial alinement for braking said rotatable part and for allowing easy withdrawal of said pawl from said first named slotted member by rolling action of said roller, and a retainer for said roller formed of spring material carried by said pawl and having two leg portions underlying said roller for maintaining said roller within the slot in said pawl and having two side plate portions at opposite ends of the slot in said pawl for preventing said roller from moving axially out of the slot in said pawl.

7. In break mechanism, the combination of a rotatable part to be braked, a slotted member fixed on said rotatable part, a pawl journaled on a fixed shaft and swingable about said shaft toward and away from said slotted member and having a transverse slot formed therein adapted to be alined with a slot of said slotted member, a roller carried by said pawl in its said slot and engageable with a slot in said first named slotted member when said pawl is moved toward said first named slotted member for braking said rotatable part and for allowing easy withdrawal of said pawl with respect to said first named slotted member by rolling action of said roller, and a retainer for said roller for yieldably holding it in the slot in said pawl comprising a spring wire extending through said pawl and over and in engagement with said shaft on which said pawl is journaled and extending into cavities formed in the ends of said roller.

8. In a brake mechanism, the combination of a rotatable part to be braked, a member fixed on said rotatable part and having a plurality of generally U-shaped slots across its periphery, a pawl member swingably mounted on an axis that is non-rotatable with respect to said rotatable part and having a transverse, generally U-shaped slot, said pawl member being movable toward and away from said first named slotted member; a roller carried by one of said members in a slot therein and engageable in a slot of said other member when pawl member is moved toward said first named slotted member for braking said rotatable part and for allowing easy withdrawal of said pawl member from said first named slotted member, each of said U-shaped slots in each member having a portion of one of its sides parallel to a portion of the opposite side of said slot so that said roller makes only line contact with the surface of said slots and so that torque on said first named slotted member does not tend to move said roller either into or out of the slots of said members, and a toggle linkage for actuating said pawl member and movable to a dead center position when the brake mechanism is fully engaged with said roller being disposed in the slots of both members.

9. In a brake mechanism, the combination of a rotatable part to be braked, a slotted member fixed on said rotatable part, a pawl member swingably mounted on an axis non-rotatable with respect to said rotatable part and movable toward and away from said slotted member, said pawl member being provided with a slot therein, and a roller carried in a slot in one of said members and engageable in a slot of said other member when said pawl member is moved toward said first named slotted member for braking said rotatable part and for allowing easy withdrawal of said braking member from first said named slotted member by rolling action of said roller on the sides of said slots of said brake member and said first named slotted member, each of said slots in which said roller is engageable being generally U-shaped with portions of its sides extending parallel to a center line joining the center of rotation of said first named slotted member and the center of said slot and having a peripheral opening only slightly wider than said roller so that said roller will ratchet over said slots without engaging the parallel portions thereof as an attempt is made to engage said roller in said slots when said slotted member is rotating faster than a predetermined speed.

References Cited in the file of this patent

UNITED STATES PATENTS 1,875,229    Falcke _____ Aug. 30, 1932